United States Patent Office 2,801,934
Patented Aug. 6, 1957

2,801,934
FATTY ALCOHOL ESTERS

Joseph W. Rizzo, Oceanside, N. Y., assignor to Chempatents, Inc., New York, N. Y., a corporation of Delaware No Drawing. Application July 16, 1952,
Serial No. 299,256

15 Claims. (Cl. 106—220)

This invention relates to synthetic oils and more particularly synthetic oils suitable for the formulation of coatings prepared by the esterification of unsaturated fatty alcohols.

Certain naturally occurring oils and processed naturally occurring oils, notably tung oil and dehydrated castor oil are widely used in the formulation of coating compositions because of their drying, heat polymerization, water and alkali resistance, color, and color retention properties. Unfortunately the supply of those oils is limited and as a result substitutes for them are essential. Other naturally occurring oils such as linseed oil, fish oils, soya bean oil have been used as substitutes for tung and dehydrated castor oils, but their properties, particularly in regard to drying characteristics and polymerization at elevated temperatures, are seriously inferior to the preferred oils.

In order to overcome the deficiencies of the more abundant naturally occurring oils, certain synthetic oils have been prepared by reacting fatty acids with polyhydric alcohols and modifying the resultant products through secondary addition reactions at the double bonds of the fatty acid radical with dicyclopentadiene, styrene, and maleic anhydride addition products. The synthetic oils, while greatly improved over the naturally occurring oils, do not have properties comparable with the dehydrated castor oil or tung oil.

It is an object of this invention to provide a synthetic oil which may be substituted for dehydrated castor oil and tung oil in the formulation of coating and other compositions.

Another object of this invention is to provide a synthetic oil having improved drying and heat polymerization characteristics.

A further object of this invention is to provide a process for the preparation of improved synthetic oils.

Still another object of this invention is to provide a synthetic oil having a wide range of viscosity which may be controlled to the desired range during the preparation of the oil.

With these and other objects in view, which will become apparent in the following detailed description, this invention resides in synthetic oil, and method of preparing it by the esterification of fatty alcohols with certain anhydrides and organic acids.

In the preparation of synthetic oils of this invention, fatty alcohols, prepared by any suitable means such as by reduction of raw fats or oils with sodium, is heated to a temperature in the range of about 400 to 480° F. with certain organic anhydrides, of which maleic anhydride is a preferred example until the esterification is substantially complete as indicated by low acid and hydroxyl numbers. The resultant esters possess greatly improved drying and high temperature polymerization properties, as compared with the synthetic oils heretofore available. An example of a specific application of this invention to prepare a synthetic oil is set forth in Example I.

EXAMPLE I

Approximately 518 grams of linseed fatty alcohols, prepared from raw linseed oil by reduction with sodium were placed in a flask equipped with a thermometer, stirring mechanism, and a water condenser equipped with a Dean and Starke tube. 98 grams of maleic anhydride, 5/10 of a gram of zinc oxide, which serves as a catalyst, and 40 grams of toluol were added to the flask. The contents were heated slowly to 227° C. (440° F.) and an inert atmosphere of nitrogen maintained over the reaction mass. The reaction mass was maintained at a temperature of 227° C. for 4½ to 5 hours until no additional water of reaction was collected in the water condenser. The reaction product was then cooled, the toluol removed by distillation, and the remaining free ester filtered. The clear, pale ester product had an acid number of 7–9, a hydroxyl number of 11–15 and a viscosity of 40–60 poises. The ester had excellent air-drying and heat polymerization characteristics, as shown by the 50 poise maleic-linseed ester in Table I.

A comparable improvement in the siccative and heat polymerization properties can be obtained with maleic esters of other alcohols, such as soya alcohols, fish alcohols and tall fatty alcohols. The esterification is of greatest value in fatty alcohols corresponding to those occurring in drying or semi-drying oils. These are straight chain types having 12 to 28 carbon atoms per molecule. Cross-linked fatty alcohols such as dimers and fatty alcohols having other radicals added at points of unsaturation may also be employed. For the synthesis of oils having air-drying properties, it is essential that the fatty alcohols in the ester contain some unsaturation. It will be appreciated that commercial unsaturated fatty alcohols generally will contain mixtures of unsaturated fatty constituents as well as some saturated fatty alcohols since the expense of making complete separations of the components is not warranted in most instances. Often mixtures of the saturated and unsaturated alcohols are advantageous in giving some plasticization.

A comparison of the air-drying, heat polymerization, and water and alkali resistant properties of maleic esters of several unsaturated fatty alcohols and other oils is set forth in the following Table I. The oils were mixed with conventional driers such as are customarily employed in the formulation of coating compositions.

Table I

| Oil | Viscosity, poises | Set to Touch (Minutes) | Tack Free (Minutes) | Polymerization at 540° F. (Minutes) | Order of Water Res. | Order of Alkali Res. |
|---|---|---|---|---|---|---|
| Maleic-Linseed Oil Alcohol Ester | 50 | 76 | 95 | 25 | 1 | 1 |
| Maleic Soy Oil Alcohol Ester | 55 | 80 | 120 | 85 | 1 | 3 |
| Maleic-Fish Oil Alcohol Ester | 50 | 95 | 130 | 75 | 7 | 5 |
| Maleic-Tall Oil Fatty Alcohol Ester | 50 | 134 | 189 | 450 | 4 | 1 |
| Linseed Oil [1] | 50 | 210 | 315 | 390 | 7 | 9 |
| Maleinized Linseed Oil [1] | 50 | 125 | 180 | 148 | 4–5 | 5 |
| Dicyclopentadiene Fish Adduct [1] | 50 | 195 | 270 | 260 | 7 | 8 |
| Maleinized Soy-Oil [1] | 50 | 200 | 275 | 500 | 4 | 5 |
| Segregated Fish-Oil [1] | 50 | 95 | 180 | 410 | 10 | 10 |
| Dehyd. Castor Oil [1] | 50 | 60 | 97 | 108 | 3 | 4 |

Similar results are obtained with synthetic oils of low viscosity, of the order of 2–15 poises. The properties of the oils of this invention, and other oils are compared in Table II.

*Table II*

| Oil | Viscosity, poises | Set to Touch (Minutes) | Tack-Free (Minutes) | Polymerization at 540° F. (Minutes) | Order of Water Res. | Order of Alkali Res. |
| --- | --- | --- | --- | --- | --- | --- |
| Maleic-Linseed oil alcohol Ester | 4 | 106 | 130 | 35–40 | 1 | 1 |
| Maleic-Soy oil alcohol Ester | 3 | 197 | 217 | 139 | 1 | 1–2 |
| Maleic-Fish oil alcohol Ester | 6 | 100 | 140 | 150 | 4 | 5 |
| Maleic-Tall oil Fatty Alcohol Ester | 3–4 | 405 | 555 | above 10 hours | 4 | 4 |
| Linseed Oil [1] | 1 | 175 | 220 | ...do... | 4–5 | 6 |
| Dehyd. Castor oil [1] | 2 | 202 | 218 | above 250 | | 1–2 |
| Fish Oil [1] | 2 | 310 | 445 | above 10 hrs. | 5 | 7 |

[1] Denotes commercial products.
In comparisons, 1 is best, 2 is next best, . . . etc.

The anhydrides or acids used in the esterification to produce the esters having enhanced air-dry and heat polymerization characteristics are those acids and anhydrides having a functionality of three or higher. The term functionality designates the sum of the reactive groups in the acid or anhydride molecule, and is the sum of the carboxyl, amido, acid chloride, or other reactive groups which will undergo condensation reactions with the hydroxyl groups of the fatty alcohols, as well as the points of unsaturation which promote addition reactions. It is preferable that the acids or anhydrides have a functionality consisting of both types of reactivity, i. e., condensation groups and addition segments. Examples of compounds which are suitable for use in the esterification reaction are maleic anhydride, trimellitic acid, pyromellitic anhydride. In addition, derivatives of those compounds, such as adducts of maleic anhydride and cyclopentadiene, adducts of maleic anhydride and fatty acids and other similar types of compounds may be employed. The term "adducts" is used to designate derivatives in which a compound is linked to the anhydride or acid by addition at a double bond. A typical example of a cyclopentadiene adducted maleic acid is 3,6-endo-methylene $\Delta^4$-tetrahydrophthalic anhydride (M. P. 165°). It is also possible to produce products having intermediate properties by blending the maleic anhydride with other anhydrides such as phthalic or trimellitic anhydride prior to the esterification. If phthalic anhydride alone is used in the esterification, the resulting esters are inferior to the natural triglyceride. A comparison of esters of fish oil fatty alcohol prepared from several anhydrides is illustrated in Table III.

The temperature and time of reaction employed according to this invention will in general range from 400 to about 480° F. and extend over a period ranging from about 4 to 8 hours. In general, the more severe the conditions of time and temperature employed in esterification, the higher the viscosity of the ester. The air-dry and heat polymerization products of the synthetic oils are improved with an increase in viscosity. The effects of time and temperature of the esterification are illustrated in Table IV.

*Table IV*

| | Viscosity (poises) | Esterification Temperature, ° F. | Time of reaction, hr. |
| --- | --- | --- | --- |
| Low-Viscosity Maleic-Linseed oil Alcohol Ester | 3 to 4 | 400 | 8 |
| Low-Viscosity Maleic-Fish oil Alcohol Ester | 4 to 6 | 400 | 8 |
| Low-Viscosity Maleic-Soy oil Alcohol Ester | 2 to 3 | 400 | 8 |
| Low-Viscosity Maleic-Tall oil Fatty Alcohol Ester | 3 to 4 | 410 | 8 |
| High-Viscosity Maleic-Linseed oil Alcohol Ester | 45 to 55 | 445 | 4½ |
| High-Viscosity Maleic-Fish oil Alcohol Ester | 50 | 445 | 5–5½ |
| High-Viscosity Maleic-Soy oil Alcohol Ester | 55 | 460 | 5 |
| High-Viscosity Maleic-Tall oil Fatty Alcohol Ester | 50 | 480 | 6 |

In the esterification reaction, it may be desirable to employ a catalyst as indicated in Example I above. The catalysts which have shown some acceleration of the esterification reaction are metallic oxides and salts, for example, litharge, zinc oxide, lead naphthenate, lead stearate, manganese naphthenate, zinc naphthenate, sodium methylate and etc. The amount used is from 0.1 to 0.3% of the total reaction mixture. In general, the

*Table III*

PROPERTIES OF ACID OR ANHYDRIDE AND THEIR FISH OIL FATTY ALCOHOL ESTERS

| Acid or Anhydride | Functionality | Unsaturation | Order of Color | Order of Air-Dry | Order of Heat Polymerization | Order of Resistance |
| --- | --- | --- | --- | --- | --- | --- |
| Maleic | 4 | yes | 1 | 1 | 1 | 1 |
| Pyromellitic | 4 | no | 8 | 2 | 2–3 | 7 |
| Trimellitic | 3 | no | 8 | 3 | 3 | 8 |
| Phthalic | 2 | no | 7 | 9 | 9 | 9 |
| 1 mol Maleic / 1 mol Phthalic | approx. 3 | yes | 3 | 6–7 | 3 | 3 |
| 3 mols Maleic / 1 mol Phthalic | 3+ | yes | 2 | 3 | 2 | 2 |
| Alkali refined fish oil | | | 3 | 7 | 8 | 5 |
| Segregated fish oil | | | 3 | 5 | 7 | 5 |
| Dryfol (dicyclopentadiene adduct of fish oil) | | | 3 | 6 | 6 | 2–3 |

In the above comparisons, 1 is best, 2 is next best, . . . etc.

effect of the catalyst on the acceleration of reaction rates is small.

The driers employed with the maleic-fatty alcohol esters in the formulation of coating compositions are those used in commercial coating compositions. Typical examples are the naphthenates of lead, cobalt, manganese,, calcium, and zinc. Others that may be used are the oleates, octoates, tallates, resinates, and other siccative agents and are used in amounts similar to those customarily employed by experienced formulators of commercial products.

Details of the esterification reaction of other esters of this invention are set forth in the following Table V. The procedural steps employed are those described in Example I.

Table V

|  | Low Visc. Maleic-Linseed oil Alcohol Ester | High Visc. Maleic-Soya oil Alcohol Ester | Low Visc. Maleic-Fish oil Alcohol Ester | High Visc. Maleic-Tall oil Fatty Alcohol Ester |
|---|---|---|---|---|
| Two mols of fatty alcohols 1 mol Maleic Anhydride gms.. | 521 | 518 | 545 | 531 |
| Zinc Oxide very fine particle size gms.. | 98 | 98 | 98 | 98 |
| Toluol gms.. | 0.5 | 0.5 | 0.5 | 0.5 |
| Esterification Temperature °F.. | 44 | 44 | 44 | 44 |
|  | 400 | 460–470 | 400 | 480 |
| Holding time at Est. Temperature hrs.. | 8 | 4½–5 | 8 | 6 |
| cc. of water of reaction collected [1] | 17.5 | 17.9 | 17.1 | 17.9 |
| Final Acid Number | 8.7 | 4.4 | 9.0 | 4.7 |
| Final Hydroxyl Number | 12.2 | 9.5 | 14.3 | 9.6 |
| Viscosity, poises | 4.0 | 55–60 | 6 | 50 |

[1] Theoretical water of reaction is 18 cc.

After the esterification is essentially completed, remove the toluol by vacuum distillation at 200–300° F., and filter.

The maleic-fatty alcohol compositions of this invention may be employed in the preparation of varnishes in the customary procedure. For instance, the synthetic oils of this invention were reacted with an ester gum in the conventional manner by heating until a suitable viscosity was obtained, cooling and reducing the resultant product with mineral spirits to 50% nonvolatile content. A comparison of the properties of the resultant varnish with varnishes prepared from the scarce tung oil, dehydrated castor oil, and linseed oils is illustrated in Table VI.

Table VI

COMPARISON OF PROPERTIES OF 25 GALLON VARNISHES, FILMS AGED 48 HRS.

| Oil | Varnish Gum | Order of Air-Dry | Order of Water Resistance | Order of Alkali Resistance |
|---|---|---|---|---|
| Maleic-Linseed Oil Alcohol Ester | Ester Gum | 2 | 2 | 2 |
| Maleic-Fish Oil Alcohol Ester | do | 3 | 2 | 2 |
| Dehydrated Castor Oil | do | 3 | 2 | 4 |
| Linseed Oil | do | 5 | 5 | 5 |
| Tung Oil | do | 1 | 1 | 1 |

In comparisons, 1 is best, 2 is next best, etc.

Varnishes may also be prepared from the synthetic oils of this invention mixed with abietyl alcohol esters. These varnishes, when compared with the conventional ester gum varnishes exhibit superior water and alkali resistances. A comparison of mixed maleic-fatty alcohol-abietyl alcohol esters with conventional varnishes having the compositions heretofore available is set forth in Table VII.

Table VII

COMPARISON OF MIXED ESTERS WITH ESTER GUM VARNISHES

| Oil | Varnish Gum | Order of Air-Dry | Order of Water Resist. | Order of Alkali Resist. |
|---|---|---|---|---|
| Maleic-Linseed Oil Alcohol-Abietyl Alcohol Ester | None | 1 | 2 | 1 |
| Maleic-Soya Oil Alcohol-Abietyl Alcohol Ester | do | 3 | 1 | 2 |
| Maleic-Fish Oil Alcohol-Abietyl Alcohol Ester | do | 4 | 4 | 3 |
| Dehydrated Castor | Ester gum | 2 | 2 | 4 |
| Linseed | do | 6 | 6 | 6 |
| Maleinized Soya | do | 5 | 4 | 5 |

In comparisons, 1 is best, 2 is next best, etc.

This invention provides a synthetic oil with improved drying characteristics, heat polymerization, and alkali and water resistance which may be substituted for the scarce tung oil and dehydrated castor oil. The synthetic oils have characteristics superior to dehydrated castor oil in many instances and characteristics superior in practically all instances to the synthetic oils heretofore available. The process of this invention allows the preparation of synthetic oils having viscosities ranging from about 2 to 70 poises, and permits the control of the viscosity within that range to the desired value.

I claim:
1. A process for the preparation of controlled-viscosity synthetic drying oils which comprises reacting an ethylenic aliphatic monohydric alcohol of the type occurring in drying and semi-drying oils and having from 12 to 28 carbon atoms in the molecule and being substantially free of triply conjugated double bonds with a polycarboxylic acid compound selected from the group consisting of maleic acid, trimellitic acid, pyromellitic acid and the anhydrides thereof at a temperature in the range of 400 to 480° F. for a time in the range of 4 to 8 hours until the reaction mixture has a viscosity in the range of 2 to 70 poises, an acid number less than 10, and a hydroxyl number less than 16.

2. A controlled-viscosity synthetic drying oil having a viscosity in the range of 2 to 70 poises obtained by the process of claim 1.

3. A process of claim 1 wherein the acid compound is maleic anhydride.

4. A controlled-viscosity synthetic drying oil having a viscosity in the range of 2 to 70 poises obtained by the process of claim 3.

5. A process of claim 3 wherein the alcohol is linseed oil fatty alcohol.

6. A controlled-viscosity synthetic drying oil having a viscosity in the range of 2 to 70 poises obtained by the process of claim 5.

7. A process of claim 3 wherein the alcohol is fish oil fatty alcohol.

8. A controlled-viscosity synthetic drying oil having a viscosity in the range of 2 to 70 poises obtained by the process of claim 7.

9. A process of claim 3 wherein the alcohol is tall oil fatty alcohol.

10. A controlled-viscosity synthetic drying oil having a viscosity in the range of 2 to 70 poises obtained by the process of claim 9.

11. A process of claim 3 wherein the alcohol is soya oil fatty alcohol.

12. A controlled-viscosity synthetic drying oil having a viscosity in the range of 2 to 70 poises obtained by the process of claim 11.

13. A process of claim 1 in which the ultimate reaction mixture is modified by the combination therewith of a varnish gum.

14. A process of claim 13 wherein the acid compound is maleic anhydride.

15. A process of claim 14 wherein the alcohol is linseed oil fatty alcohol.

References Cited in the file of this patent

UNITED STATES PATENTS

| | | |
|---|---|---|
| 2,101,227 | Werntz | Dec. 7, 1937 |
| 2,157,697 | Hagedorn | May 9, 1939 |
| 2,464,202 | Rust | Mar. 15, 1949 |

OTHER REFERENCES

Hackh's Chemical Dictionary, 1944, by Grant, 3rd Edition, page 19.